(12) United States Patent
Suzuoki

(10) Patent No.: US 7,818,724 B2
(45) Date of Patent: Oct. 19, 2010

(54) METHODS AND APPARATUS FOR INSTRUCTION SET EMULATION

(75) Inventor: Masakazu Suzuoki, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 644 days.

(21) Appl. No.: 11/053,512

(22) Filed: Feb. 8, 2005

(65) Prior Publication Data

US 2006/0179278 A1    Aug. 10, 2006

(51) Int. Cl.
*G06F 9/45*    (2006.01)
(52) U.S. Cl. .................. 717/136; 717/137; 717/149; 712/208; 712/209; 712/227
(58) Field of Classification Search ......... 717/136–161; 712/31, 37, 41, 208, 209, 227
See application file for complete search history.

(56) References Cited

U.S. PATENT DOCUMENTS

| | | | |
|---|---|---|---|
| 4,388,682 A * | 6/1983 | Eldridge | 712/211 |
| 5,909,565 A * | 6/1999 | Morikawa et al. | 712/200 |
| 6,430,674 B1 * | 8/2002 | Trivedi et al. | 712/43 |
| 6,496,922 B1 * | 12/2002 | Borrill | 712/209 |
| 6,526,491 B2 | 2/2003 | Suzuoki et al. | |
| 6,711,667 B1 * | 3/2004 | Ireton | 712/35 |
| 7,251,811 B2 * | 7/2007 | Rosner et al. | 717/138 |
| 7,266,811 B2 * | 9/2007 | Mohamed et al. | 717/136 |
| 2004/0133884 A1 * | 7/2004 | Zemach et al. | 717/138 |
| 2004/0243983 A1 * | 12/2004 | Kumura | 717/136 |
| 2005/0097525 A1 * | 5/2005 | Stone et al. | 717/136 |
| 2005/0289520 A1 * | 12/2005 | Overall | 717/137 |

OTHER PUBLICATIONS

Translation-invariant propelinear codes, Rifa, J.; Pujol, J., Information Theory, IEEE Transactions on, vol. 43 Issue: 2 Mar. 1997, IEEE, pp. 590-598.*

Run-time code generation as a central system service, Franz, M., Operating Systems, 1997., The Sixth Workshop on Hot Topics in, May 5-6, 1997, IEEE, pp. 112-117.*

Compact binaries with code compression in a software dynamic translator, Shogan, S.; Childers, B.R., Design, Automation and Test in Europe Conference and Exhibition, 2004. Proceedings, vol. 2 Feb. 16-20, 2004, IEEE, pp. 1052-1057 vol. 2.*

Compiler-directed physical address generation for reducing dTLB power, Kadayif, I.; Nath, P.; Kandemir, M.; Sivasubramaniam, A., Performance Analysis of Systems and Software, 2004 IEEE International Symposium on—ISPASS 2004, IEEE, pp. 161-168.*

A Dynamic Binary Translation Approach to Architectural Simulation, Cain et al., published on Mar. 2001, pp. 1-10.*

(Continued)

*Primary Examiner*—Wei Y Zhen
*Assistant Examiner*—Satish Rampuria
(74) *Attorney, Agent, or Firm*—Matthew B. Dernier, Esq.; Gibson & Dernier LLP

(57) ABSTRACT

Methods and apparatus provide for translating a software program page by page from a first instruction set architecture (ISA) into a second ISA using one or more of a set of processors of a multi-processor system; and executing the translated software program using a dedicated other processor of the multi-processor system.

21 Claims, 6 Drawing Sheets

OTHER PUBLICATIONS

Gross et al. "Parallel compilation for a parallel machine" Proceedings of the Sigplan '89 Conference on programing Language Design and Implementation, Jun. 21, 1989, XP-002394370 (pp. 91-100).

Cain H W et al: "A dynamic binary translation approach to architectural simulation" Computer Architecture News, ACM, New York, NY,US, vol. 29, No. 1, Mar. 2001, AB (cont'd) XP002237506, (pp. 27-36).

Cogwell B H et al: "Timing insensitive binary-to-binary migration across multiprocessor architectures" Paralle and Distributed Real-Time Systems, 1995. Proceedings of AC (cont'd) Third Workshop on Santa Barbara, CA, USA, Apr. 1995, Los Alamitos, CA, USA, IEEE Comput. Soc, 1995, XP010148075 (pp. 193-194).

International Search Report and Written Opinion based on PCT/JP2006/302422, dated Aug. 30, 2006 (12 pages).

* cited by examiner

METHODS AND APPARATUS FOR INSTRUCTION SET EMULATION

BACKGROUND

The present invention relates to methods and apparatus for transferring data within a multi-processing system.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

In some multi-processing systems, each processor may employ a relatively small local memory in which to execute program code (as opposed to a larger random access memory, RAM). The larger RAM (main or system memory) may be used for bulk storage. The processors may also employ direct memory access (DMA) technology to transfer data from the main memory to the respective local memories.

It may be desirable to execute a program written using a first instruction set architecture (ISA) on a processing system designed to execute a second ISA. For example, in the multi-processor system described above, the plurality of processors may be operable to execute programs written in, e.g., the Power PC ISA. A program written using a different ISA, such as IA32, IA64, etc., would need to be translated and compiled in PowerPC to run. Prior art techniques for performing the translation/compilation are not satisfactory, al least with respect to multi-processor environments.

SUMMARY OF THE INVENTION

Aspects of the present invention contemplate using at least one of the processors in a multi-processor system as an executing processor, which executes translated and compiled code. Others of the processors (or a subset thereof) may be used as translating/compiling (TC) processors. A first of the TC processors preferably begins to translate and compile a first page (e.g., of a size that may be stored in local memory) of the original program. If a branch involves another page of the program, a next processor begins translating and compiling that page. This sequence continues until all participating TC processors are busy or the translation and compilation is completed. The executing processor(s) start executing the program when the first page translation and compilation is complete and continue the execution until a page is not ready or program execution is complete.

In accordance with one or more embodiments of the present invention, methods and apparatus provide for: translating a software program page by page from a first instruction set architecture (ISA) into a second ISA using one or more of a set of processors of a multi-processor system; and executing the translated software program using a dedicated other processor of the multi-processor system.

The step of translating may include: translating a first page of the software program using a first processor of the set; and translating a second page of the software program using a second processor of the set when the first page includes a branch instruction to the second page. The methods and apparatus may further provide for: translating another page of the software program using the first processor of the set when the first processor has completed translating the first page of the software program.

The recited actions are preferably repeated until all of the pages of the software program are translated.

Preferably one or more of the processors are dedicated to translating the software program and one or more others of the processors are dedicated to executing the software program.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
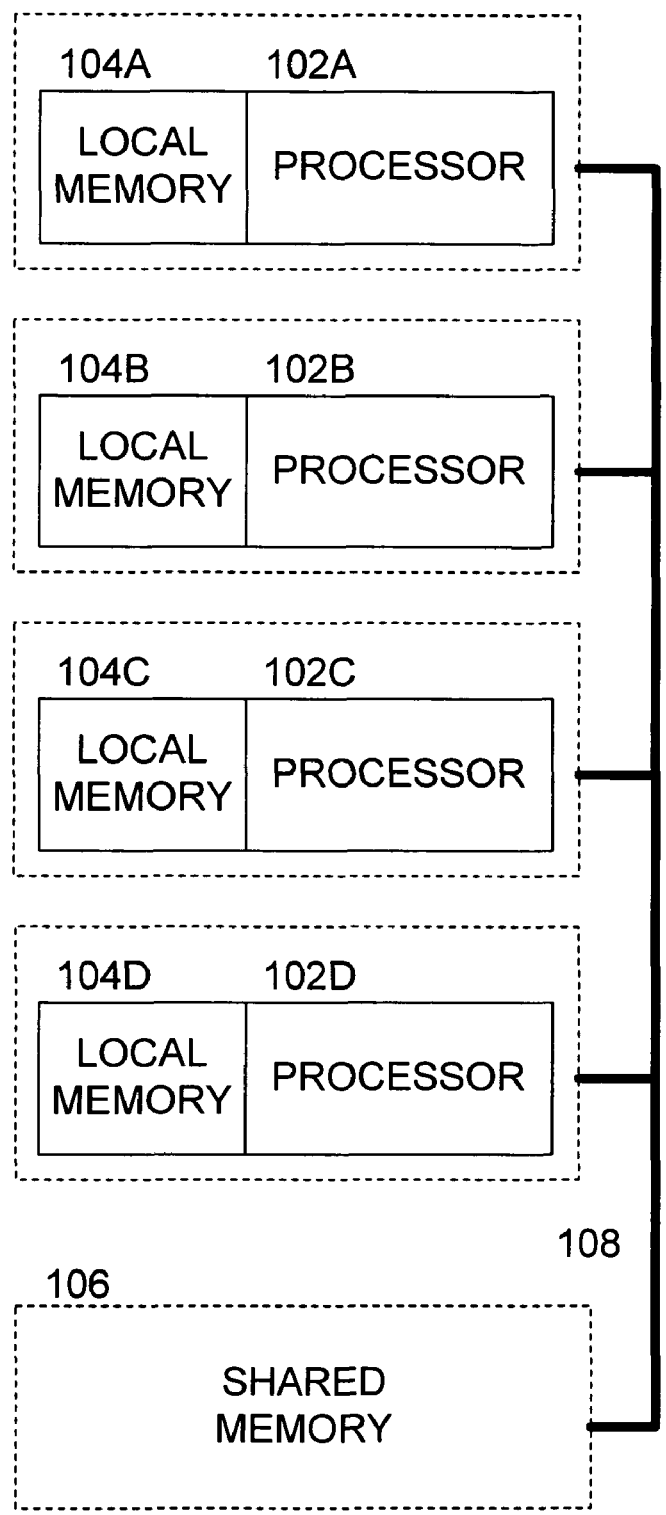
FIG. 1 is a block diagram illustrating the structure of a multi-processing system having two or more sub-processors that may be adapted in accordance with one or more aspects of the present invention.

With reference to the drawings, wherein like numerals indicate like elements, there is shown in FIG. 1 a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

FIG. 1 is a block diagram of a multi-processing system 100 that may be adapted to implement the features discussed herein and one or more further embodiments of the present invention. The system 100 includes a plurality of processors 102A-D, associated local memories 104A-D, and a shared memory 106 interconnected by way of a bus 108. The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

The processors 102 may be implemented utilizing any of the known technologies that are capable of requesting data from the system memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function. As on-chip space may be limited, the size of the local memories 104 may be much smaller than the system memory 106.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown, which may be disposed internally or externally with respect to the processors 102.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

In accordance with one or more embodiments of the present invention, the processors 102 may execute software programs written in a first ISA (e.g., Power PC) by copying executable code from the main memory 106 into the local memory 104 and running the software programs within the respective local memories 104. As the local memories 104 may be relatively small (such as 256 KB), it may be desirable to permit portions of the software program (as opposed to the entire program) and any associated data to be copied into the local memory 104 and executed. In addition, the system 100 is operable to translate and compile software programs written in another ISA (e.g., IA64) into the first ISA such that the processors 102 may execute those programs as well.

Figure 2:
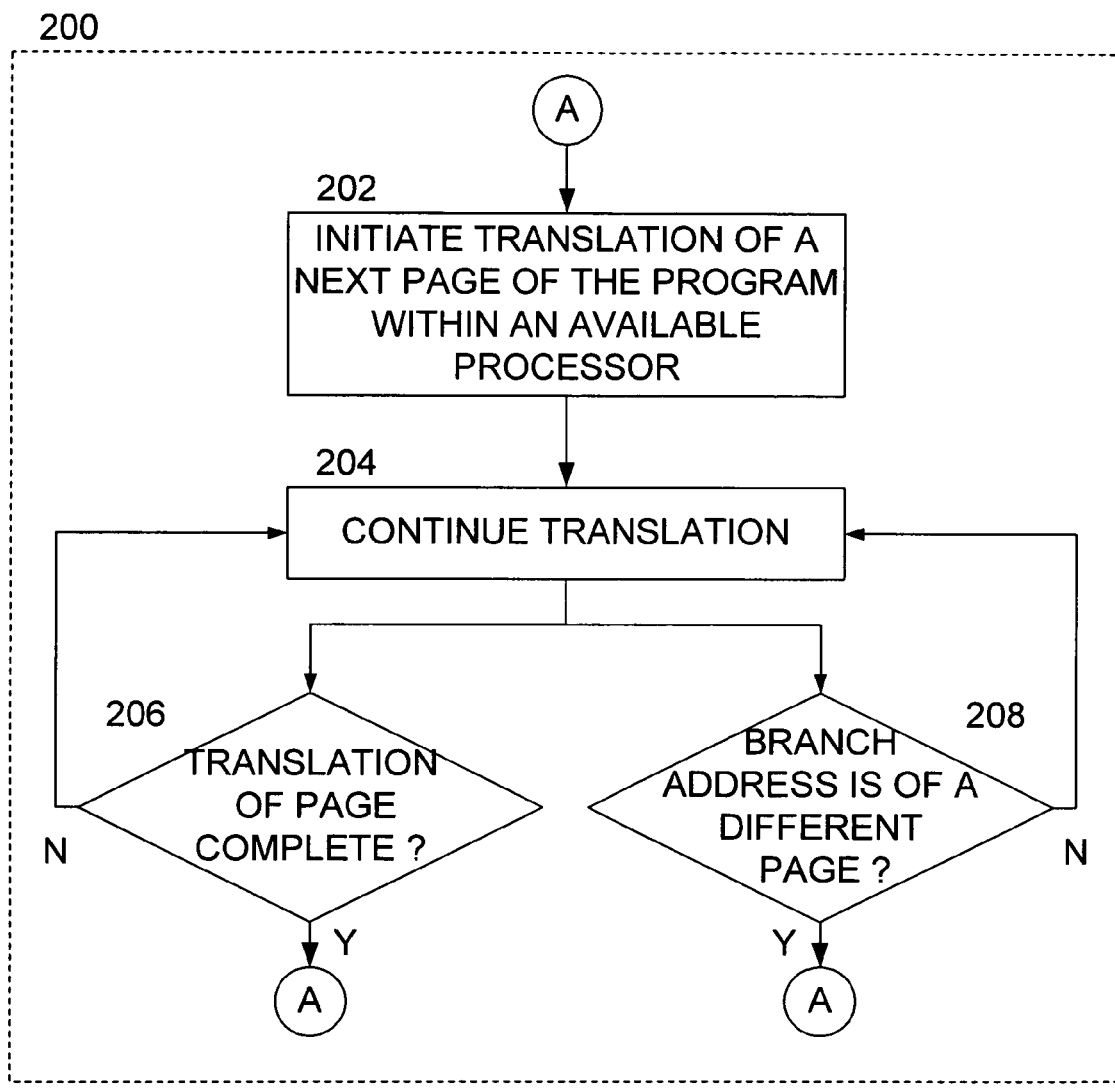
FIG. 2 is a flow diagram illustrating process steps that may be carried out by one or more of the processors of the system of FIG. 1 and/or other embodiments herein.

Reference is now made to FIG. 2, which is a flow diagram illustrating process steps that may be carried out by the processing system 100 of FIG. 1 (or other embodiments herein). FIG. 2 illustrates a processing routine 200 that includes a number of processor steps. In accordance with one or more embodiments of the present invention, the processing system 100 is preferably operable to translate a software program written with a first instruction set architecture (ISA) into a second ISA. The translated software program is then executed by one or more of the processors 102 in accordance with the second ISA. For example, it is contemplated that the processors 102 are operable to execute programs written in the second ISA, but not the first ISA. By way of example, the processors 102 may be operable to execute software programs written in the Power PC ISA. The software program, however, may have been written in another ISA, such as IA64 or the like.

Preferably, one or more processors 102 are operable to translate the software program from the first ISA to the second ISA, while one or more other processors 102 are operable to execute the translated software program. It is preferred that the one or more processors 102 that translate the software program are dedicated to that function and the one or more processors 102 that execute the translated software program are dedicated to that function.

The one or more processors 102 that translate the software program from the first ISA into the second ISA are preferably operable to perform that function by taking respective portions of the software program and translating those portions in accordance with a processing routine. One example of a suitable routine is routine 200 of FIG. 2. The routine 200 translates the software program page by page from the first ISA into the second ISA using one or more of a set of processors 102 of the multi-processor system 100 of FIG. 1. At action 202, the translation of a next page of the software program is initiated by an available one of the processors 102 of the set. At action 204, the translation is continued until one or more events trigger further actions. For example, at action 206 a determination is preferably made as to whether the translation of the given page is complete. If the result of the determination is in the negative, then the process flow preferably loops backs to action 204, where the translation of the given page is continued. On the other hand, if the result of the determination at action 206 is in the affirmative, then the processor flow preferably loops back to action 202 where the translation of a next page of the program is initiated. For example, if a first processor 102 of the set translates a first page of the software program into the proper ISA and the translation is completed (the determination at action 206 is in the affirmative), then the first processor 102 or another one of the processors 102 may initiate the translation of a second page of the software program (action 202).

Another event that can trigger further actions of the routine 200 is the translation of a branch instruction of the software program. In this regard, at action 208 a determination is preferably made as to whether the branch address is of a different page of the software program. If the result of the determination at action 208 is in the negative, then the process flow preferably loops back to action 204 where the translation is continued. On the other hand, if the result of the determination at action 208 is in the affirmative, then the process flow preferably loops back to action 202, where the translation of another page of the software program is initiated. In particular, the translation of the next page of the software program is the page to which the branch instruction addresses (as determined at action 208). Preferably, another of the processors 102 carries out the task of translating this new page of the software program.

Figure 3:
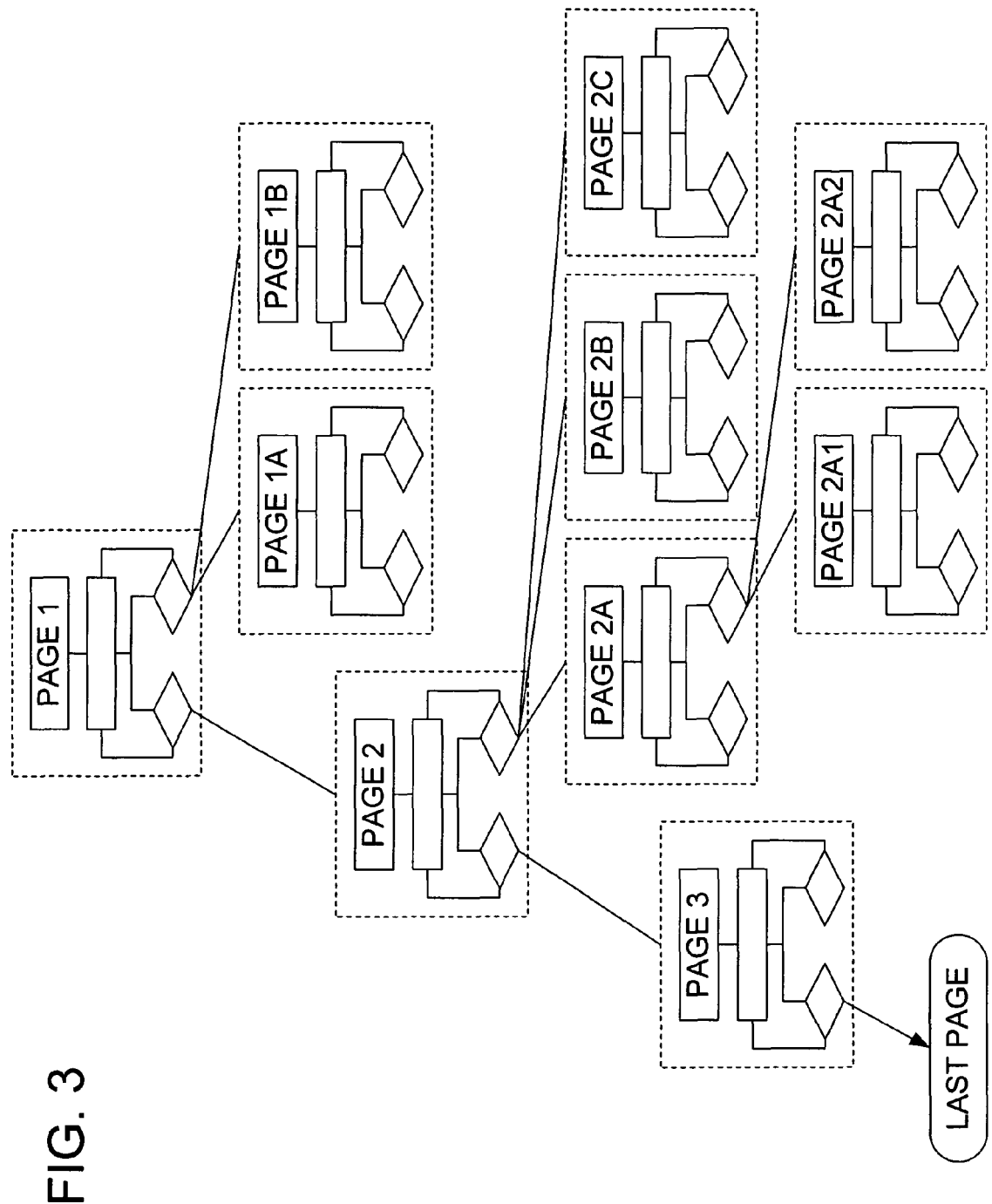
FIG. 3 is a further flow diagram illustrating process steps that may be carried out by one or more of the processors of the system of FIG. 1 and/or other embodiments herein.

The translation routine 200 of FIG. 2 is preferably repeated as necessary to translate each page of the software program. With reference to FIG. 3, one example of how the routine 200 may be utilized to translate a plurality of pages of the software program is illustrated. Initially, a first page of the software program may be translated by a first processor 102 of the system 100. During the translation, two branch instructions may be encountered, which address different pages of the software program, such as page 1A and 1B. In response, one or more of the other processors 102 are preferably operable to carry out the translation of those pages while the first processor 102 continues translating page 1 of the software program.

At some point, the first processor may complete the translation of page 1 of the software program, which causes that processor (or one or more of the other translation processors 102) to initiate the translation of page 2 of the software program. As with page 1 of the software program, page 2 of the software program may include a number of branch instructions, which address different pages of the software program, such as page 2A, page 2B, and page 2C. One or more of the available processors 102 of the system 100 may initiate the translation of these new pages of the software program. It is noted that the translation of pages 2A, 2B, and 2C may be carried out concurrently with the translation of page 2 or other pages of the software program so long as there are processors that are available to carry out the translation. If no processors are available to carry out the translation, such as because they are busy with translating other pages of the software program, then the task of translating a new page of the software program may be temporarily postponed. Thereafter, when a processor 102 becomes available, such processor may take up the task of translating the page that has been waiting. This process preferably repeats until all pages of the software program are translated and are ready for execution.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 4:
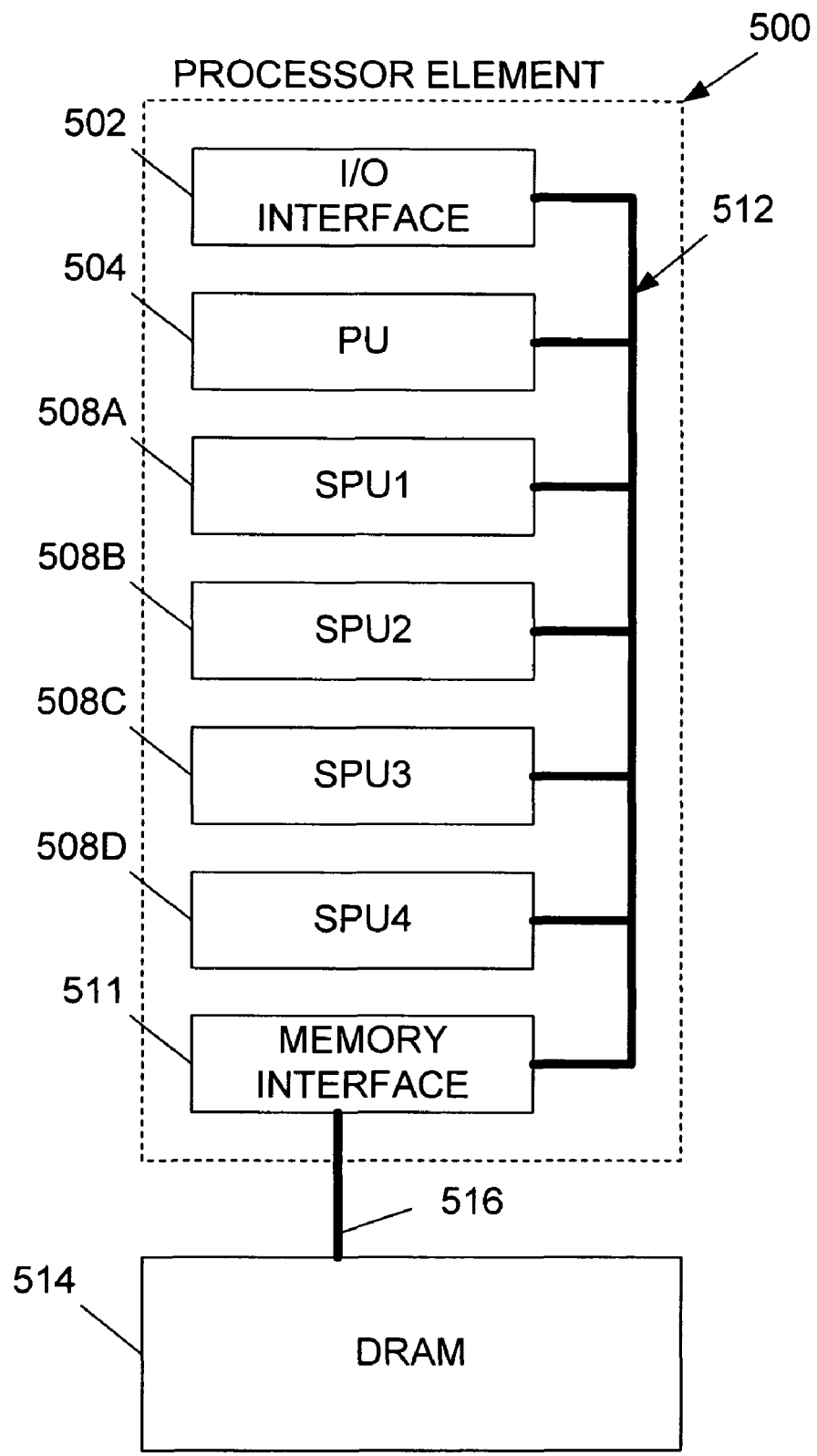
FIG. 4 is a block diagram illustrating a preferred processor element (PE) that may be used to implement one or more further aspects of the present invention.

With reference to FIG. 4, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 5:
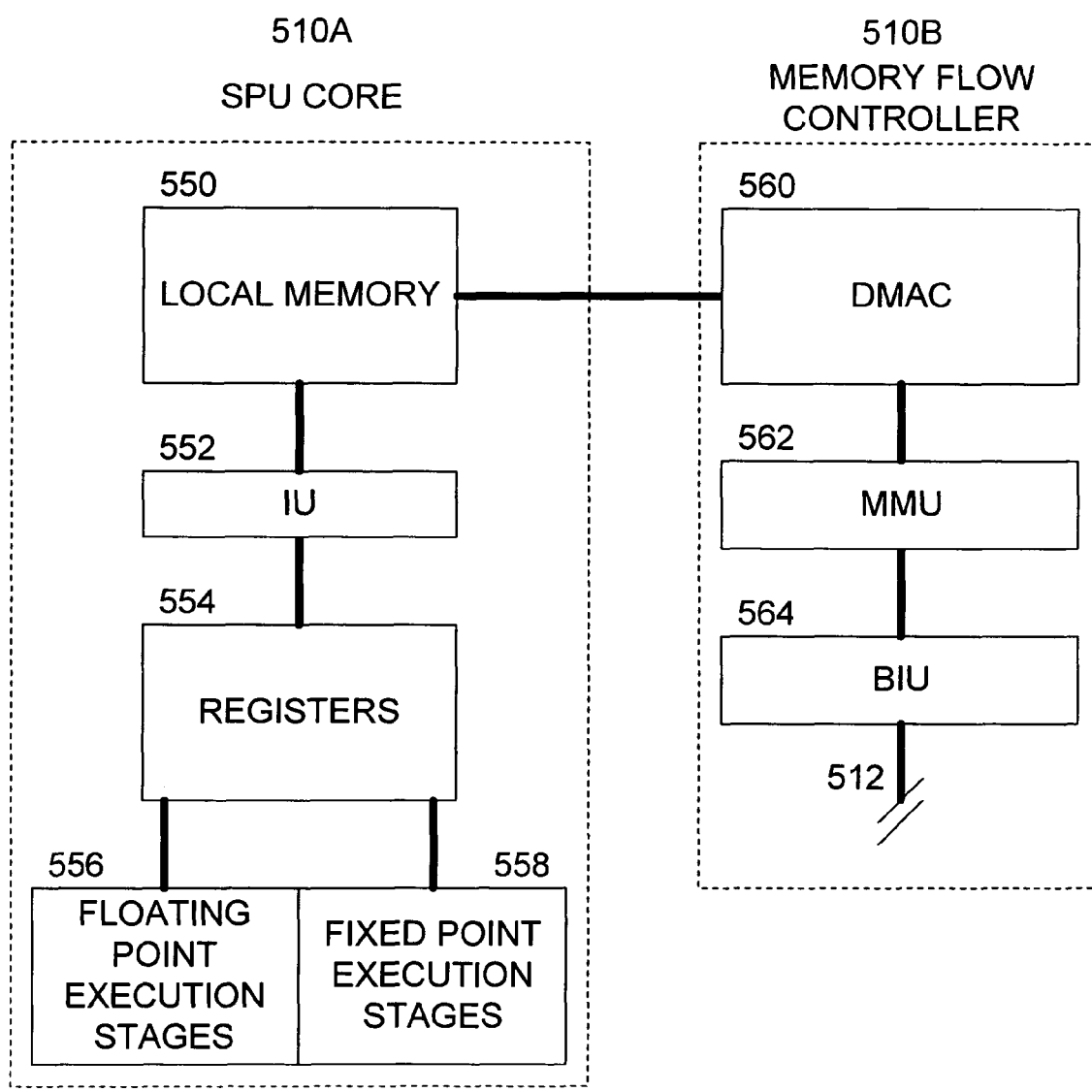
FIG. 5 is a diagram illustrating the structure of an exemplary sub-processing unit (SPU) of the system of FIG. 4 that may be adapted in accordance with one or more further aspects of the present invention.

FIG. 5 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 6:
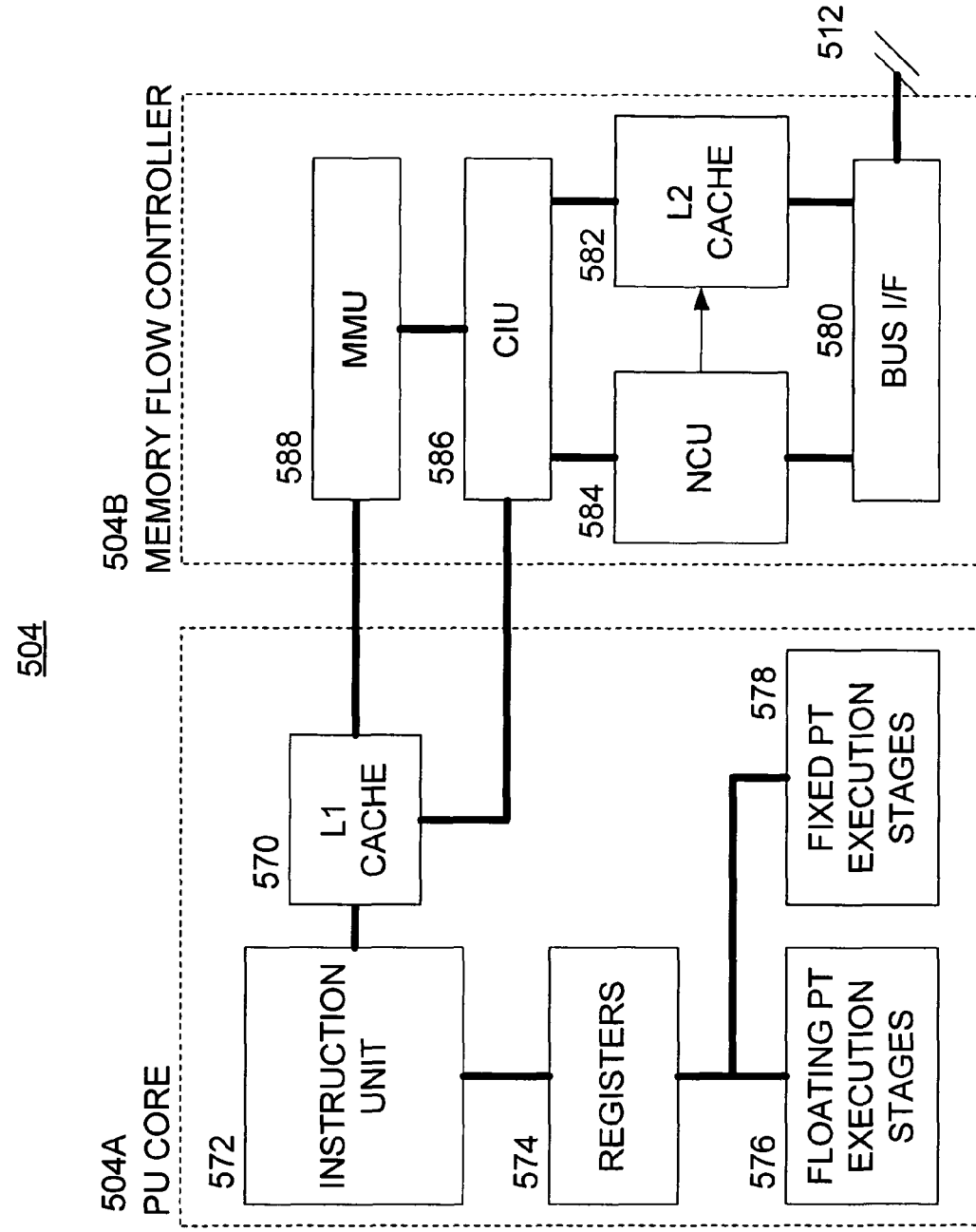
FIG. 6 is a diagram illustrating the structure of an exemplary processing unit (PU) of the system of FIG. 4 that may be adapted in accordance with one or more further aspects of the present invention.

FIG. 6 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    translating, page-by-page, one or more pages of a software program written with a first instruction set architecture (ISA) into a second ISA using at least one processor of a multi-processor system;
    translating one or more further pages of the software program using at least one further processor when the one or more pages of the software program include a branch to the one or more further pages of the software program; and
    executing at least part of the translated software program using at least one other processor of the multi-processor system.

2. The method of claim 1, wherein the multi-processor system is operates to execute programs written with the second ISA but not the first ISA.

3. The method of claim 1, comprising translating one or more still further pages of the software program using at least one available processor when any of the pages of the software program include a branch to the one or more still further pages of the software program.

4. The method of claim 3, comprising repeating the recited steps until all of the pages of the software program are translated.

5. The method of claim 1, comprising executing the one or more further pages of the software program using only one other processor of the multi-processor system.

6. A method, comprising:
    translating a software program page by page from a first instruction set architecture (ISA) into a second ISA using one or more of a set of processors of a multi-processor system;
    translating a first page of the software program using a first processor of the multi-processor system;
    translating a second page of the software program using a second processor of the multi-processor system when the first page includes a branch instruction to the second page; and
    executing the translated software program using a dedicated other processor of the multi-processor system.

7. The method of claim 6, further comprising translating another page of the software program using the first processor of the set when the first processor has completed translating the first page of the software program.

8. The method of claim 6, comprising repeating the recited steps until all of the pages of the software program are translated.

9. An apparatus, comprising:
a plurality of processors capable of operative communication with a main memory; and
a respective local memory coupled to each of the processors, wherein:
one or more of the processors are operate to translate, page by page, one or more pages of a software program written with a first instruction set architecture (ISA) into a second ISA,
one or more further ones of the processors operate to translate one or more further pages of the software program when the one or more pages includes a branch instruction to the one or more further pages; and
one or more others of the processors operate to execute the translated software program.

10. The method of claim 9, wherein the one or more others of the processors operate to execute programs written with the second ISA but not the first ISA.

11. The apparatus of claim 9, wherein the one or more processors operate to translate the software program page by page.

12. The apparatus of claim 11, wherein the one or more processors as a set operate to:
translate a first page of the software program using a first processor of the set; and
translate a second page of the software program using a second processor of the set when the first page includes a branch instruction to the second page.

13. The apparatus of claim 12, wherein the set of processors operate to: translate another page of the software program using the first processor of the set when the first processor has completed translating the first page of the software program.

14. The apparatus of claim 13, wherein the set of processors operate to repeat the recited actions until all of the pages of the software program are translated.

15. The apparatus of claim 9, wherein the local memories are not hardware cache memories.

16. The apparatus of claim 15, wherein each processor is capable of executing programs within its local memory, but each processor is not capable of executing programs within the main memory.

17. The apparatus of claim 9, wherein the processors and associated local memories are disposed on a common semiconductor substrate.

18. The apparatus of claim 9, wherein the processors, associated local memories, and the main memory are disposed on a common semiconductor substrate.

19. A storage medium containing an executable program, the executable program operating to cause a multi-processing system to execute actions including:
translating a software program page by page from a first instruction set architecture (ISA) into a second ISA using one or more of a set of processors of the multi-processor system;
translating a first page of the software program using a first processor of the multi-processor system;
translating a second page of the software program using a second processor of the multi-processor system when the first page includes a branch instruction to the second page; and
executing the translated software program using a dedicated other processor of the multi-processor system.

20. The storage medium of claim 19, further comprising translating another page of the software program using the first processor when the first processor has completed translating the first page of the software program.

21. The storage medium of claim 20, comprising repeating the recited steps until all of the pages of the software program are translated.

* * * * *